United States Patent [19]

Vasseur

[11]  4,278,267
[45]  Jul. 14, 1981

[54] EQUIPMENTS FOR ATTACHING TRAILERS
[75] Inventor: Gilbert M. Vasseur, La Compte par Houdain, France
[73] Assignee: Societe Anonyme Etablissements Vasseur & Cie, Champigny, France
[21] Appl. No.: 932,456
[22] Filed: Aug. 10, 1978
[30] Foreign Application Priority Data
Sep. 9, 1977 [FR] France ............................... 77 27286
[51] Int. Cl.³ ............................ B60D 1/00; B60T 7/20
[52] U.S. Cl. ............................. 280/406 R; 188/112 A; 280/446 B
[58] Field of Search ........... 280/406 A, 406 R, 446 B, 280/446 R, 456 R, 428; 188/112 A
[56] References Cited
FOREIGN PATENT DOCUMENTS
1598248  7/1970  France .

Primary Examiner—John P. Silverstrim
Attorney, Agent, or Firm—Michael J. Striker

[57] ABSTRACT

Improvement of equipment for attaching trailers with inertia controlled braking arrangement, being of the type including stabilizing bars whose exposure to tension provides an coupling arrangement for nullifying the reaction force affecting the supports of the movable control components. This reaction force results from inertia brake in the trailer and creates an increasing adverse force affecting said movable components. Characteristic is that this adverse force is generated by two elastically deformable arms freely articulated on a common axle located at the end of the coupling seat of the trailer. The free ends of either of these arms, usually curved downwards, is in permanent elastic abutment with the corresponding attachment bar. Elements are provided for keeping the arms on the bars during traction, turning and braking.

6 Claims, 5 Drawing Figures

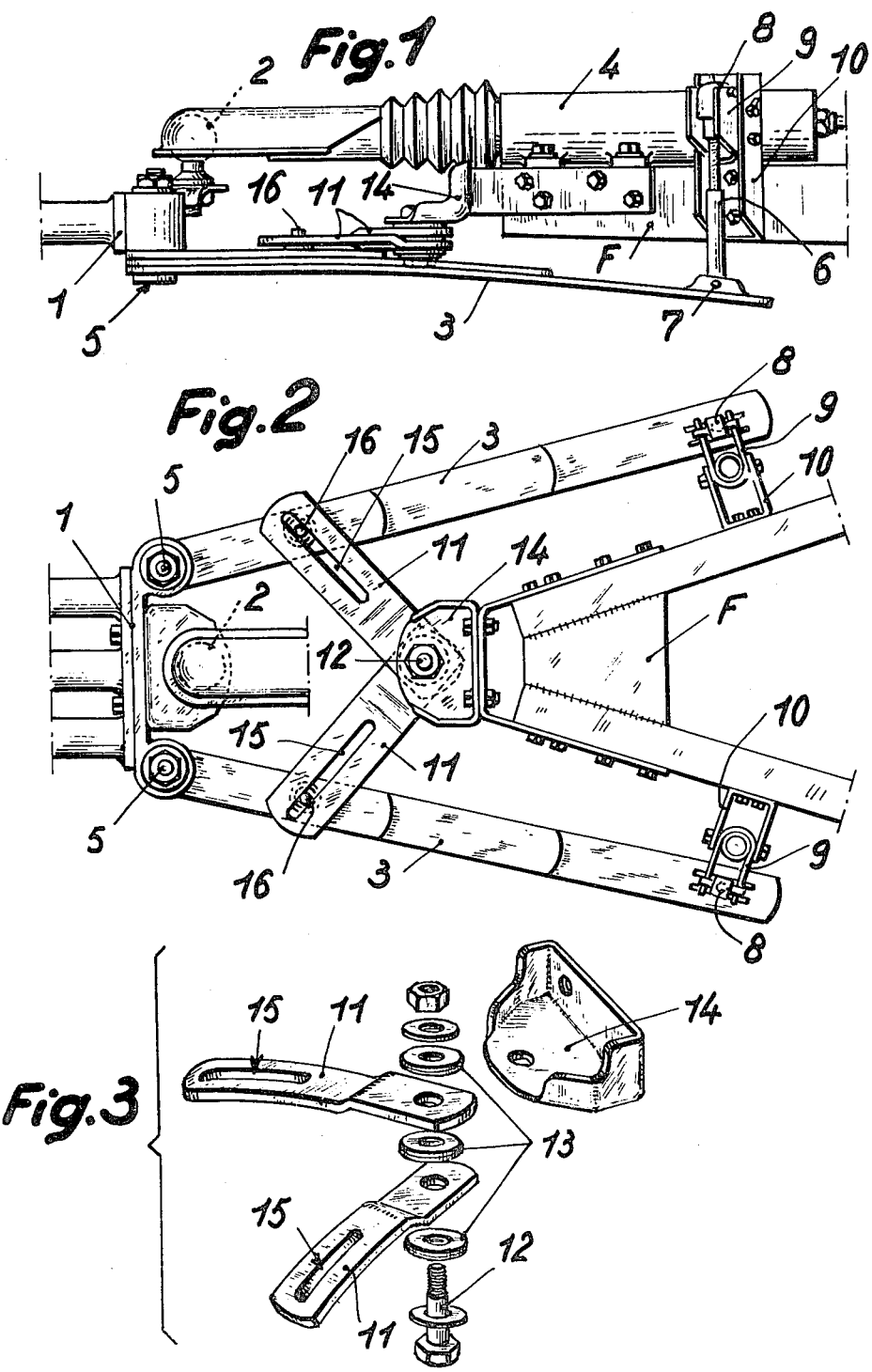

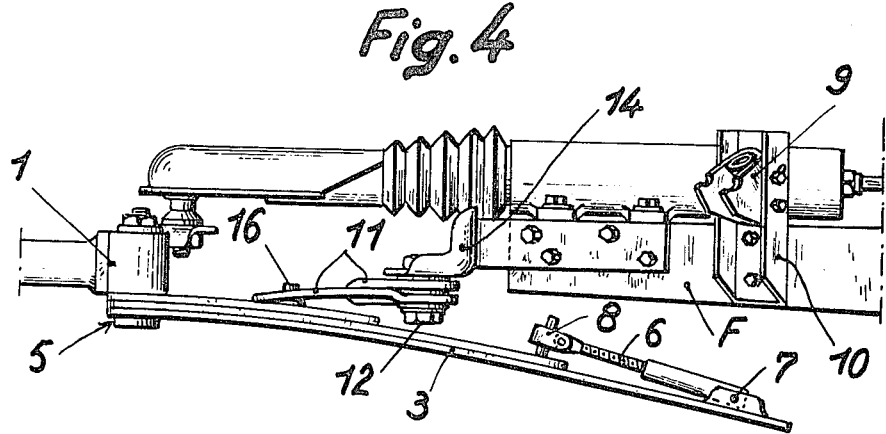
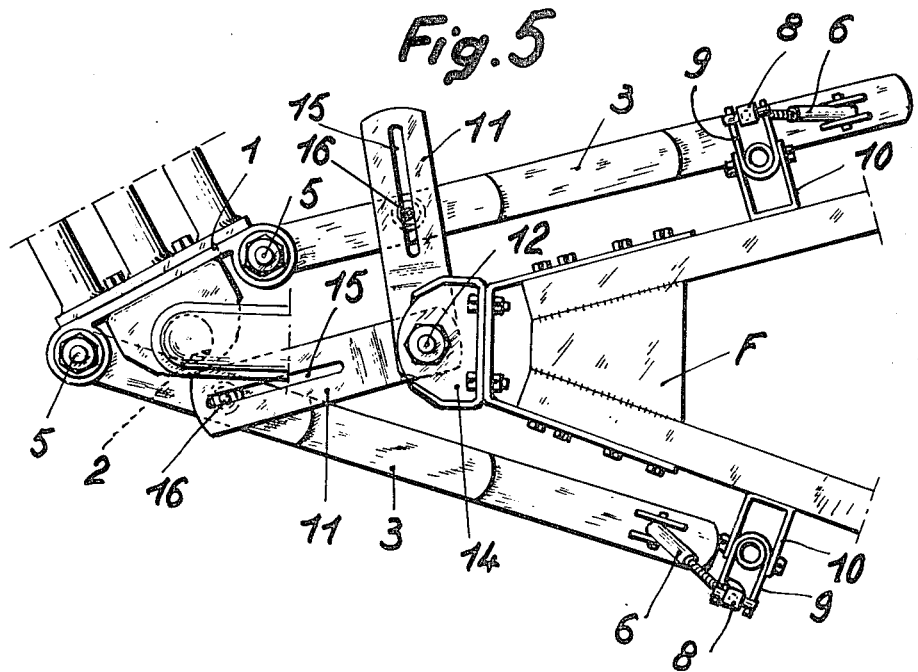

EQUIPMENTS FOR ATTACHING TRAILERS

In the French Patent Number 1,598,248, applied for on Nov. 29, 1968, in the name of the present Applicant, description was given of improvement in attaching arrangements for trailors, having an inertia controlled braking equipment and pertaining to the type containing stabilizing bars exposed to tension are provided with an equilibrating coupling counteracting the forces affecting the tractor vehicle.

These improvements lead to nullification of the reaction force that the inertia of the brakes of the trailer applies to the movable controlling components by impact of an increasing force affecting said components, which force is engendered on putting the stabilizing bars under tension.

This force was transmitted to the coupling seat by means of two lateral telescopic assemblies attaching it to the corresponding stabilizing bars. Each telescopic assembly was appropriately articulated by means of the system of a universal joint and was steadily extended by a spring, whose detent ensures constancy of the force transferred upon said coupling seat at any angle existing between the trailer and the tractor.

Said telescopic assemblies with a spring were satisfactory, but their manufacture was expensive. Also a certain inconvenience was created near the end portion of the coupling seat hampering location of the "jockey" wheel.

The improvement brought in by this invention and overcoming said drawbacks consists in the use of two elastically deformable arms, pivotally jointed on a common axle at the extremity of the coupling seat of the trailer. These arms are appropriately curved for arriving in a constant and elastic abutment by their free ends on each of the stabilizing bars of the coupling. These bars and arms include entraining means and guides, which determine relative angular positions in the braking device and of the angle formed during turning between the trailer and the tractor vehicle.

The invention will be better comprehended from the description following herein and referring to the drawings attached exemplarily only. On these drawings:

FIG. 1 is an elevational view of the attaching arrangement, with the usual stabilizing bars, and shows the elastic tying to the trailer coupling seat, as envisaged by the invention;

FIG. 2 is a plan view;

FIG. 3 is a perspective disassembled view of the arrangement of the invention;

FIG. 4 is a view analogous to that of FIG. 1, demonstrating the position of the arms and the stabilizing bars prior to coming under tension;

FIG. 5 is a plan view of the attaching arrangement during the turning of the tractor of the vehicle.

Referring now to FIG. 1, reference numerals 1 designates a usual coupling fitting of the vehicle tractor, 2 stands for a spherical joint for a seat F of the trailer and 3 are stabilizing bars. Said seat is equipped with the usual inertia braking system 4.

In this coupling system, the stabilizing bars 3 are made of spring steel, they are pivoted at 5 at the fitting 1.

The stabilizing bars 3 are constituted of spring steel. They are pivotally connected to the coupling fitting 1 at 5. The free end of each of the bars 3 is tensionally connected with the corresponding side of the seat F by a puller 6. The latter is adjustable and is connected with each of the bars 3, on the one hand, and to the seat F by means of a universal joint 9, on the other hand. The universal joint 9 is fixedly mounted in a known manner between prongs of a profiled mounting piece 10 which is firmly attached to each side of the seat F.

The bars 3 are exposed to tension, and thereby a force is generated on the braking system 4, which is directed downwardly. This force is detrimental to free movement of the braking system, since it affects inertia of the hydraulic control of the latter.

The arrangement of the present invention allows counteraction or this force by opposing thereto a counter force created on the stabilizing bars 3. For this purpose there are used two arms 11 which are elastically deformable, freely pivotable on a common axle 12 with interposition of needled abutments 13 on a piece 14 connected to the end portion of the coupling seat of the trailer. The arms are appropriately bent downwardly and are elastically and steadily mounted by their free ends at a predetermined point of either of the coupling stabilizing bars 3.

For achieving this, according to one embodiment, each arm 11 includes a slot 15 extending longitudinally in which a shouldered finger 16 can slide, which finger is carried by one of the underlying stabilizing bars 3.

The free ends of the arms 11 constantly abut the bars 3 during the traction, braking and turning.

FIG. 5 illustrates the position during turning, i.e. the angular displacement of the articulated assembly, formed by the bars 3 and the arms 11 capable of elastic deformation.

FIG. 4 shows that before the stabilizing bars get stretched, the pullers 6 mentioned hereabove cause the free ends of the arms 11—that are normally bent downwards—to abut said bars so that during tension of the bars these arms bow elastically upwardly and this permanent elastic impact nullifies the reaction applied to the braking system.

Quite naturally, this invention is not limited to the mode of embodiment here described, but covers all variants of form, material and dimensions.

I claim:

1. In a coupling for connecting a trailing vehicle having a coupling seat to a tractor vehicle, said coupling including a coupling fitting mounted on said tractor vehicle, an inertial braking system mounted on said coupling seat, a spherical joint pivotally connecting said braking system to said coupling fitting, a pair of elastically deformable stabilizing bars, forward ends of said bars being pivotally connected to said coupling fitting about vertical axes at opposite lateral sides of said spherical joint, respectively, and means connected to said coupling seat for tensioning rearward ends of said bars upwardly so as to provide for equilibration of forces affecting the tractor vehicle, the improvement comprising means for eliminating the effect of said tensioning of said bars on said braking system, said eliminating means comprising a pair of elastically deformable arms, first end portions of said arms being pivotally connected to said coupling seat about a common vertical axis, and second end portions of said arms being in constant permanent abutment with said pair of bars respectively, said arms exerting a downward force on said bars in opposition to the force of said tensioning means.

2. The improvement as defined in claim 1, wherein each of said arms is so bent that at least the second end portion thereof is directed downwardly.

3. The improvement as defined in claim 1, wherein a projection is provided on the surface of each bar, engaged with said second end portion, each of said arms, being provided with a longitudinal slot receiving said projection, so that said arms are always in contact with said bars.

4. The improvement as defined in claim 3, wherein said coupling seat is provided with an axle mounting said first end portions for pivoting relative to said axle.

5. The improvement as defined in claim 4; and further comprising antifriction means for eliminating friction between the first end portions of said arm mounted on said axle.

6. The improvement as defined in claim 5, wherein said antifriction means include at least one washer located between said first end portions of said arms, mounted on said axle.

* * * * *